United States Patent [19]

Minagawa et al.

[11] Patent Number: 4,828,735
[45] Date of Patent: May 9, 1989

[54] AQUEOUS LUBRICANT COMPOSITION

[75] Inventors: Kenichiro Minagawa; Kazuo Furuse, both of Yokohama; Yoshiharu Tanizaki, Ebina; Heihachiro Okabe, Tokyo, all of Japan

[73] Assignee: Nippon Oil and Fats Co., Ltd., Tokyo, Japan

[21] Appl. No.: 117,903

[22] Filed: Oct. 29, 1987

Related U.S. Application Data

[63] Continuation of Ser. No. 922,769, Oct. 24, 1986, abandoned, which is a continuation of Ser. No. 799,603, Sep. 23, 1985, abandoned, which is a continuation of Ser. No. 511,420, Jul. 6, 1983, abandoned.

[30] Foreign Application Priority Data

Jan. 19, 1982 [JP] Japan ................. 57-6272

[51] Int. Cl.$^4$ .......................... C10M 173/02
[52] U.S. Cl. ................. 252/49.3; 252/52 A; 252/51.5 A
[58] Field of Search ................. 252/52 A, 49.3, 51.5 A

[56] References Cited

U.S. PATENT DOCUMENTS

| | | | |
|---|---|---|---|
| 2,825,693 | 3/1958 | Beaubien | 252/49.3 |
| 3,000,826 | 9/1961 | Gililland | 252/49.3 |
| 3,310,489 | 3/1967 | Davis | 252/49.3 |
| 3,346,501 | 10/1967 | Boehmer | 252/73 |
| 3,676,344 | 7/1972 | Kuceski | 252/49.3 |
| 3,992,312 | 11/1976 | Genjida et al. | 252/49.3 |
| 4,107,061 | 8/1978 | Steinwold et al. | 252/49.3 |
| 4,374,741 | 2/1983 | Rieder | 252/49.3 |

FOREIGN PATENT DOCUMENTS

| | | | |
|---|---|---|---|
| 523794 | 4/1956 | Canada | 252/49.3 |
| 0034132 | 8/1981 | European Pat. Off. | |
| 0059461 | 9/1982 | European Pat. Off. | |
| 0014696 | 1/1982 | Japan | 252/52A |
| 0029898 | 2/1983 | Japan | 252/52 A |
| 0089695 | 5/1983 | Japan | 252/52 A |
| 0096698 | 6/1983 | Japan | 252/52 A |
| 0721526 | 1/1955 | United Kingdom | 252/49.3 |

1199693 7/1970 United Kingdom .

Primary Examiner—William R. Dixon, Jr.
Assistant Examiner—Margaret B. Medley
Attorney, Agent, or Firm—Flynn, Thiel, Boutell & Tanis

[57] ABSTRACT

An aqueous lubricant composition contains a first polyether component represented by the general formula I given below, a second polyether component expressed by the general formula II given below and a polyamide component represented by the general formula III. This composition exhibiting a highly advantageous viscosity behavior over a wide range of temperatures has a high resistivity against shearing stress and a superior storage stability, and is thus very suitable for use as a hydraulic fluid, metal drawing fluid, cutting fluid, press oil and the like even in the form of a high water base fluid having a water content over 80% by the components are weight:

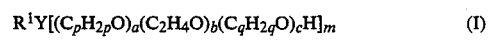

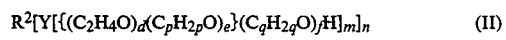

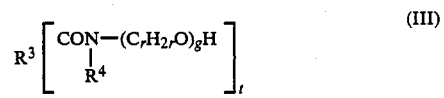

in which $R^1$ represents a hydrocarbon group having 5–26 carbon atoms, $R^2$ is a residue of a polyhydric alcohol, a polyhydric phenol or a polyamine each having 2–26 carbon atoms, $R^3$ denotes a hydrocarbon group having obtained when a mono- or polycarboxylic acid having 8 to 54 carbon atoms is reacted with an alkanolamine or an alkylalkanolamine to form the formula III compound $R^4$ represents hydrogen atom, a hydrocarbon group having 1–26 carbon atoms or a group expressed by $(C_sH_{2s}O)_hH$, Y stands for an oxygen or nitrogen atom, p and q represent an integer of 3 or 4, r and s denote an integer of 2 or 3, g and h represent each an integer from 1 to 20 and t is an integer from 1 to 5, wherein $a \geq 0$, $b \geq 2$, $c \geq 0$, $d > 0$, $e \geq 0$ and $f > 0$.

12 Claims, No Drawings

AQUEOUS LUBRICANT COMPOSITION

This application is a continuation of U.S. Ser. No. 922 769, filed Oct. 24, 1986, which is a continuation of Ser. No. 779 603, filed Sept. 23, 1985, which is a continution of Ser. No. 511 420, filed July 6, 1983 all abandoned.

BACKGROUND OF THE INVENTION

1. Field of the Invention

The present invention relates to an aqueous lubricant composition and, more specifically, to a hydrous type lubricant composition to be used for hydraulic fluid, metal cutting fluid, metal working fluid and so on.

2. Description of the Prior Art

It has heretofore been widely practiced to use water-base lubircants for hydraulic fluid, metal cutting fluid, metal working fluid and so on, since they do not cause fire accidents due to leakage thereof etc.

Water-base lubricants represented by a non-inflammable hydraulic fluid based on water/glycol, soluble type cutting fluid and so on contain usually a water-soluble high polymer compound such as polyether etc. as a lubricant and as a thickener in an amount of 15–40% by weight. In recent years, economizations in resources and energy became a social interest and it has thus become desirable to find an aqueous lubricant having higher water content. This request has been marked especially for non-inflammable hydraulic fluid based on water/glycol, namely a high water base fluid (HWBF) having a water content over 90% by weight, far beyond that (about 40% by weight) of conventional water base hydraulic fluid.

The increase in the water content up to over 90% by weight will inevitably cause a decrease in the concentration of the thickener in the hydraulic fluid which can no longer be cured by the conventional thickeners. Thus, for example, a water-soluble polyether having a molecular weight below 50,000 employed heretofore principally as the thickeners for non-inflammable hydraulic fluid based on water/glycol is stable against the mechanical shearing stress, but it exhibits low thickening effect and offers no greater increase of the viscosity on addition in a small amount, resulting in a larger leakage from seams of the machine due to the inferior lubricating power, so that it is not suitable as a thickener for the hydraulic fluid. It has also been proved, that a polyethylene oxide having a molecular weight within the range from several hundred thousand to several millions exhibiting a marked thickening effect even in a small addition amount is liable to undergo breakdown of the molecular weight due to the trend of being subject to molecular scission under a mechanical shearing stress, so that it may suffer a considerable lowering of the viscosity during operation and is not suitable as a thickener for water base hydraulic fluid.

SUMMARY OF THE INVENTION

An object of the present invention is thus to provide an aqueous lubricant composition having high water content in which the defects in the prior art are remedied.

Another object of the present invention is to provide an aqueous lubricant composition exhibiting a superior stability against mechanical shearing stress and having a greater thickening effect.

A further object of the present invention is to provide an aqueous lubricant composition exhibiting very small viscosity change within the operational temperature range thereof.

Other objects of the present invention will become evident from the descriptions set forth below.

DETAILED DESCRIPTION OF THE INVENTION

The aqueous lubricant composition according to the present invention contains a polyether compound expressed by the general formula I given below, a polyether compound represented by the general formula II also given below and an amide compound denoted by the general formula III recited also below.

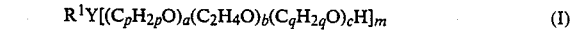

$$R^1Y[(C_pH_{2p}O)_a(C_2H_4O)_b(C_qH_{2q}O)_cH]_m \qquad (I)$$

In this formula, $R^1$ represents a hydrocarbon group having 5 to 26 carbon atoms, Y stands for oxygen or nitrogen atom, p and q denote each an integer of 3 or 4, a and c indicate each an average number of addition moles of an alkylene oxide having 3 or 4 carbon atoms, b is an average number of addition moles of ethylene oxide and m is an integer of 1 or 2, wherein $a \geq 0$, $b \geq 2$, $c \geq 0$, wherein $a+b+c=2$ to 200 and $(a+c)/b=0$ to 7/3, and wherein the oxyethylene group and the oxalkylene group(s) having 3 or 4 carbon atoms are added in a form of block segments.

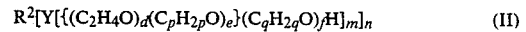

$$R^2[Y[\{(C_2H_4O)_d(C_pH_{2p}O)_e\}(C_qH_{2q}O)_f H]_m]_n \qquad (II)$$

In this formula, $R^2$ denotes a residue of a polyhydric alcohol, a polyhydric phenol or a polyamine each having 2 to 26 carbon atoms, Y stands for oxygen or nitrogen atom, p and q represent each an integer of 3 or 4, d indicates an average number of addition moles of ethylene oxide, e and f denote each an average number of addition moles of an alkylene oxide having 3 or 4 carbon atoms, m is an integer of 1 or 2 and n denotes an integer from 2 to 8, wherein $d > 0$, $e \geq 0$ and $f > 0$, wherein $d+e+f=3,000$, $e/d=0$ to 1 and $f/(d+e)=1/9$ to 7/3, and wherein the chain segment within { } consists of a random addition chain, if e is not 0, and the chain segment(s) enclosed in [ ] exist in a form of addition blocks arranged in the sequence given in this formula.

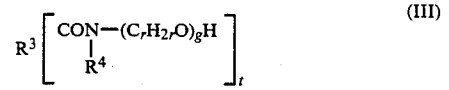

$$R^3\left[\begin{array}{c} CON-(C_rH_{2r}O)_gH \\ | \\ R^4 \end{array}\right]_t \qquad (III)$$

In this formula, $R^3$ denotes a hydrocarbon group having obtained when a mono- or polycarboxylic acid having 8 to 54 carbon atoms is reacted with an alkanolamine or an alkylalkanolamine to form the formula III compound $R^4$ represents hydrogen atom, a hydrocarbon group having 1 to 26 carbon atoms or the group $(C_sH_{2s}O)_hH$ and t is an integer from 1 to 5, wherein r and s represent each an integer of 2 or 3 and g and h denote each an average number of from 1 to 20.

In the above given general formula I, the hydrocarbon group expressed by $R^1$ includes aliphatic linear, cyclic and branched and saturated and unsaturated ones and aromatic ones, such as those residues of, for example, saturated aliphatic alcohols, unsaturated aliphatic alcohols, cycloaliphatic alcohols, aromatic alcohols, alkyl-substituted phenols, alkenyl-substituted phenols, saturated aliphatic amines, unsaturated aliphatic amines, cycloaliphatic amines, aromatic amines and so on, each having 5 to 26 carbon atoms.

Examples of alcohols, phenols and amines corresponding to the residue $R^1$ include pentanol, hexanol, heptanol, octanol, nonanol, decanol, undecanol, dodecanol, tridecanol, tetradecanol, pentadecanol, hexadecanol, heptadecanol, octadecanol, nonadecanol, cyclpentanol, cyclohexanol, benzyl alcohol, cinnamyl alcohol, oleyl alcohol, octyl phenol, nonyl phenol, decylamine, dodecylamine, tridecylamine, tetradecylamine, pentadecylamine, hexadecylamine, heptadecylamine, octadecylamine, oleylamine and so on.

The alkylene oxides having 3 and 4 carbon atoms which are expressed by $C_pH_{2p}O$ and $C_qH_{2q}O$ in the above general formulae I and II include propylene oxide, butylene oxide, tetrahydrofuran and so on. They can be added either solely or in combination. The symbol m represents a number of chains combined directly to Y and corresponds to 1, if Y stands for oxygen atom, or corresponds to 2, if Y stands for nitrogen atom. The polyethers represented by the general formula I include also those in which either one or both of a and c are zero.

The polyether compounds represented by the general formula I can be produced from a starting material consisting of one or more of alcohols, phenols and amines having hydrocarbon residues corresponding to $R^1$ by subjecting them to an addition of ethylene oxide solely or together with one or more of said other alkylene oxides having 3 and 4 carbon atoms respectively so as to form block segments in the addition chain. The addition polymerization in a form of block segments can be carried out in a selected sequence of addition without restriction and it is even possible to carry out the addition polymerizations of them in an alternate manner. There is no restriction as to the manner of addition polymerization and it is possible to carry out the reaction, for example, in the presence of an alkali catalyst at a temperature between 60° and 180° C.

The polyhydric alcohols, polyhydric phenols and polyamines each having 2 to 26 carbon atoms corresponding to the residue $R^2$ in the above general formula II include, for example, ethylene glycol, propylene glycol, butanediol, hexylene glycol, octylene glycol, glycerin, trimethylolpropane, pentaerythritol, sorbitol, glucose, sucrose, ethyl diethanolamine, butyl diethanolamine, triethanolamine, tripropanolamine, N,N'-dinaphthyl-p-phenylenediamine, 4,4'-diaminodiphenylmethane, 4,4'-diaminodicyclohexylmethane, ethylenediamine, diethylenetriamine, triethylenetetramine, tetraethylenepentamine, pentaethylenehexamine, bisphenol A, hydrogenated bisphenol A, 4,4'-butylidene-bis(6-tert.-butyl-3-methylphenol), 4,4'-thio-bis(6-tert.-butyl-3-methylphenol), catechol, resorcinol and so on.

The symbol n represents the number of chains directly bound to the residue $R^2$, which is the number corresponding to the valency of residue $R^2$ (from 2 to 8).

The polyether compounds expressed by the above general formula II can be obtained from a starting material consisting of a polyhydric alcohol, a polyhydric phenol or a polyamine corresponding to the residue $R^2$ by subjecting it to an addition polymerization of ethylene oxide solely or in combination with one or more of the alkylene oxides having 3 and 4 carbon atoms respectively in a random distribution and then to a further addition of one or more of the previously suggested alkylene oxides having 3 and 4 carbon atoms respectively in such a manner that they build up block segments in the addition chain.

The amide compounds expressed by the above general formula III to be employed according to the present invention are primary and secondary alkanolamides of monocarboxylic acids or polycarboxylic acids with valences from 2 to 5 each having 8 to 54 carbon atoms. The symbol t in the general formula III represents the number corresponding to the valency of this carboxylic acid and stands for 1 to 5.

Examples of these mono- and polycarboxylic acids include caprylic acid, pelargonic acid, capric acid, undecanoic acid, lauric acid, tridecanoic acid, myristic acid, pentadecanoic acid, palmitic acid, heptadecanoic acid, stearic acid, nonadecanoic acid, arachic acid, behenic acid, cerotic acid, undecylenic acid, oleic acid, elaidic acid, linolic acid, linoleic acid, dimerized or trimerized acids obtained by oligomerization of unsaturated fatty acids, azelaic acid, undecanedioic acid, dodecanedioic acid, tridecanedioic acid, pentadecanedioic acid, hexadecanedioic acid, octadecanedioic acid, eicosanedioic acid and so on.

As the primary and secondary amines to be employed to form the amido group of the general formula III, there may be enumerated, for example, monoethanolamine, diethanolamine, monopropanolamine, dipropanolamine, ethylmonoethanolamine, butylmonoethanolamine, addition products of these obtained by adding thereto ethylene oxide and/or propylene oxide each solely or in mixture.

The amide compounds of the above general formula III can be obtained by reacting a mono- or polycarboxylic acid having 8–54 carbon atoms or an ester of such carboxylic acid with a lower alcohol, such as, methyl ester, ethyl ester, n-propyl ester, iso-propyl ester or glyceride, with equivalent or excess amount of an alkanolamine or an alkylalkanolamine mentioned above with, if necessary, adding thereon further ethylene oxide or propylene oxide.

In reacting the lower alcohol ester of said carboxylic acid with an alkanolamine using an alkali catalyst, the amide compound represented by the general formula III can be obtained in high purity by using a nearly equivalent amount of the alkanolamine, whereas in the reaction of carboxylic acid with alkanolamine, the amide compound of general formula III can only be obtained if a considerably excessive amount of alkanolamine is used, with the amide compound obtained being contaminated by the unreacted alkanolamine. However, it is permissible to use either of the amide products in the lubricant composition according to the present invention.

As to the polyether compound expressed by the general formula I, the number of moles of addition of ethylene oxide and other alkylene oxides is limited so as to meet the condition $a+b+c=2$ to 200, because of that the influence of the hydrophobic groups of the starting compound will be too large to acquire a water-soluble property in case the above sum is less than 2 moles and, on the other hand, if this sum exceeds 200 moles, the proportion of the starting compound in the product molecule will be too low and thus the water-solubility will become too high, resulting in an extinguishment of the thickening effect.

It is desirable to carry out the addition polymerizations of ethylene oxide and other alkylene oxides having 3 and 4 carbon atoms so as to build up a block segment for each of them, because, if a random addition polymerization is employed, an adequate balance between the hydrophilic and hydrophobic groups will not be attained, so that no thickening effect is reached.

The ratio of the moles of ethylene oxide to the moles of the other alkylene oxides having 3 and 4 carbon atoms should be at least 3/7, since otherwise the water-solubility will be deteriorated and the product cannot be used for an aqueous lubricant.

The starting compound, to which alkylene oxide(s) are added, for the polyether compound expressed by the general formula I should have at least 5 carbon atoms, because otherwise the hydrohobic property of the starting compound is too low to reach an adequate balance between the hydrophilic and hydrophobic groups even by adding the alkylene oxide(s), so that no thickening effect is attained.

In the polyether compound represented by the general formula II, the total number of addition moles of ethylene oxide and the other alkylene oxides should be in such a range that $d+e+f=10\sim3,000$, since the molecular weight will be too low to exhibit a thickening effect in case the above sum is less than 10 moles and, on the other hand, if the sum exceeds 3,000 moles, the decrease in the viscosity due to molecular scission under the mechanical shearing stress will become too intensive, which is problematic in practical use.

It is necessary that the ratio of $f/(d+e)$ is kept within the range from 1/9 to 7/3, since the product will no longer be useful as an aqueous lubricant due to the inferior water-solubility if the said ratio exceeds the value 7/3, whereas an adequate balance between the hydrophilic and hydrophobic groups will not be achieved and a thickening effect will never be obtained if the sum is less than 1/9, because the proportion of the hydrophobic part inherited from the alkylene oxide(s) in the molecular becomes too low.

In the polyether compound represented by the general formula II, it is necessary to carry out the addition polymerization of ethylene oxide as well as the other alkylene oxides in such a manner that the random addition segment or the polyethylene oxide segment within { } and the other polyalkylene oxide segment will form block segments arranged in the sequence given in [ ], since an adequate balance between the hydrophilic and the hydrophobic groups cannot be attained and no thickening effect is realized if the addition polymerization is carried out in a random manner, and furthermore because a reverse sequence of the addition segments will also result in the extinguishment of the thickening effect.

In the amide compound described by the general formula III, the number of addition moles of alkylene oxide should not exceed 20 moles, since otherwise no thickening effect will be reached and the compound cannot be used for an aqueous lubricant.

Here, the number of carbon atoms in the mono- and polycarboxylic acids should be restricted within the range from 8 to 54, since no thickening effect will be realized due to too low a hydrophobic property inherited from the hydrocarbon group, if the number of carbon atoms is less than 8.

The polyether compound expressed by the general formula I, the polyether compound represented by the general formula II and the amide compound represented by the general formula III can be combined in a desired proportion in order to form an aqueous lubricant composition by dissolving the so formulated mixture in water. It is possible to employ one or more compounds for each of the three components of these general formulae I to III according to the present invention.

The aqueous lubricant composition according to the present invention may preferably consist of 0.1-30% by weight of the compound of general formula I, 0.1-30% by weight of the compound of general formula II, 0.1-20% by weight of the compound of general formula III and 20-99.7% by weight of water.

If a higher lubricity is required, the aqueous lubricant composition according to the present invention should preferably contain further a water soluble compound having a number average molecular weight from 500 to 100,000. Here a preferable composition may be:

Compound of general formula I: 0.1-25% by weight
Compound of general formula II: 0.1-25% by weight
Compound of general formula III: 0.1-20% by weight
Water-soluble compound as above: 0.1-10% by weight
Water: 20-99.6% by weight The aqueous lubricant composition according to the present invention can contain in every case 80-99% by weight of water, in order to be used as a high water base hydraulic fluid.

For the above mentioned water soluble compound, there may be employed for example salts of polyacrylic acid, salts of maleic acid copolymers, polyacrylamide, polyethyleneimine, water-soluble urea resins, polyvinylalcohol, polyether derivatives, poly(meth)acrylic acid derivatives and so on. Among them, polyether derivatives which have higher affinity to the compounds of the general formulas I to III may be preferred.

It is possible to incorporate, upon requirement, in the aqueous lubricant compositions according to the present invention other conventional additives, such as for example, an extreme pressure agent, oiliness agent, antifoaming agent, antioxidant, corrosion inhibitor, metal chelating agent and so on.

Among the polyether compounds represented by the formulae I and II, those having limited molecular structures exhibit a definite thickening effect within a limited range. While, for example, a compound obtained by adding 9 moles of ethylene oxide to one mole of oleyl alcohol shows a thickening ability, this thickening effect appears only within a limited range in the vicinity of the cloud point (35° C.) of the aqueous solution thereof and thus, it cannot be employed for the base formulation of an aqueous lubricant.

While compositions composed from the polyether compounds represented by the general formulae I and II exhibit relatively high cloud points and superior thickening effects over a wider temperature range, they have yet a shortcoming that the change in viscosity with temperature is relatively great, so that the use thereof for an aqueous lubricant is restricted.

On the other hand, it is known that an aliphatic alkanolamide such as a 1:2 condensation product of oleic acid with diethanolamine, which is one of the amide compounds expressed by the general formula III, has a superior thickening effect. However, the viscosity variation with temperature of the aqueous composition prepared from this product is too high and the stability of the aqueous solution thereof upon storage is also inferior, so that this product is not satisfactory for use for the base formulation of an aqueous lubricant.

While it is known, furthermore, that alkylene oxide adducts of an alkanolamide of a fatty acid exhibit an improved storage stability with some thickening effect and lower change in viscosity with temperature than that of an alkanolamide of the fatty acid, the thickening effect is decreased considerably, so that they are not able to be used solely for the base formulation of an aqueous lubricant.

In contrast thereto, the aqueous lubricant compositions according to the present invention in which the polyether compounds represented by the general formulae I and II are combined together with the amide compound expressed by the general formula III exhibit an excellent stability against shearing stress and have a superior thickening property with very low viscosity variation with temperature, so that they are suitable for the base formulation of an aqueous lubricant.

As explained above, the aqueous lubricant composition according to the present invention exhibits a highly advantageous behavior in viscosity over a wide temperature range and has a superior stability against mechanical shearing stress and an excellent storage stability, so that it can be used for many applications, for example, as hydraulic fluid, metal drawing as well as cutting fluid, press oil and so on. The base formulation to be employed for the aqueous lubricant composition according to the present invention brings forth a sufficient lubricity even using in a small amount, so that enough high performances will be attained even when it is formulated into a high water base fluid having a water content over 80% by weight.

Below the present invention is further explained by reciting Examples together with some Production Examples.

PRODUCTION EXAMPLE 1

Production of a Compound of General Formula I

In a 50 l gas-tight reaction vessel, there were placed 10.7 kg (40 moles) of oleyl alcohol and 53 g of potassium hydroxide as catalyst, whereupon 15.8 kg (360 moles) of ethylene oxide were introduced so as to cause addition polymerization in nitrogen gas atmosphere at 90°–130° C. under a superatmospheric pressure of 0.7–5.0 Kg/cm$^2$. 26.5 kg of crude reaction product of polyoxyethylene glycol monooleyl ether were obtained. The potassium hydroxide in the crude reaction product was neutralized with an aqueous hydrochloric acid solution and the water was then removed under a reduced pressure of 50 mmHg or lower at 80°–120° C. for two hours, whereupon 25.5 kg of refined product were obtained after filtering off the precipitated salt.

PRODUCTION EXAMPLE 2

Production of a Compound of General Formula II 620 g (10 moles) of ethylene glycol and 70 g of potassium hydroxide as catalyst were placed in a 50 l gas-tight reaction vessel. This was then subjected to reaction with 19.4 kg (440 moles) of ethylene oxide and 11.6 kg (200 moles) of propylene oxide in nitrogen atmosphere at 90°–120° C. under a superatmospheric pressure of 0.5–5.0 Kg/cm$^2$ so as to cause block-wise addition polymerization to obtain 31.0 kg of crude reaction product of polyoxyethylenepolyoxypropylene glycol (block polymer). By performing the after-treatment as in Production Example 1, 31 kg of refined product were obtained.

In the same manner as above, various products were produced, which were used in the following Examples.

EXAMPLE 1

There were prepared aqueous lubricant compositions according to the present invention using the compounds of general formulae I to III produced as above. The cloud point, thickening effect, storage stability and shear stability were tested for these lubricant compositions and were compared with comparison formulations of the prior art, the results of which are recited in Table 1 together with the concrete formulations of the aqueous lubricants tested.

While some compounds are indicated in Table 1 by structural formulae not corresponding to the previously defined general formulae I to III for the sake of easier understanding of the molecular structure, the symbols I and II appended at each end of the structural formula suggest the correspondence to these general formulae. The symbol IIIa represents a compound of said general formula III, which is either a reaction product of a lower alcohol ester of a carboxylic acid with nearly equivalent amount of alkanolamine or an adduct of this reaction product with ethylene oxide or with propylene oxide. The symbol IIIb denotes a compound of general formula III, which is a reaction product of a carboxylic acid with twice molar amount of an alkanolamine. The symbol IV represents the other water soluble compound explained previously. Compounds expressed by the structural formulae without these symbols are those which do not fall under the general formulae I to IV. The prefix i in the structural formulae in Table 1 indicates that the compound has a branched structure. ($C_4H_8O$) indicates a butylene oxide unit. The segment enclosed within { } exists in a random polymerization chain and others consist of block polymer chain.

In Table 1, "indeterminable" in the column of kinematic viscosity means that the kinematic viscosity was not able to be determined because a homogeneous solution was never obtained at the temperature of determination.

The storage stability was estimated by observing the turbidity after storage in a thermostat at 5° C. for 24 hours, wherein the case of maintaining complete transparency is marked by O, the case of occurrence of turbidity is marked by Δ and the case of occurrence of phase separation is marked by X.

The stability against shearing stress was determined using an ultrasonic shear stability tester (output: 150 W., 10 KHz). The solution to be tested was subjected to the ultrasonic wave irradiation at a temperature of 40° C. for an irradiation period of 60 minutes. The shear stability was calculated from the kinematic viscosity $v_1$ at 25° C. of the test solution before the irradiation and the kinematic viscosity $v_2$ at 25° C. of the test solution after the irradiation by the following equation:

Shear Stability = $v_2/v_1$

As is seen from Table 1, a sole employment of the compounds of general formulae I to III may result in a lower cloud point sometimes causing phase separation at higher temperatures (for example, Sample No. 8), exhibiting greater thermal variation of the composition viscosity and inferior storage stability (for example, Sample No. 10), and thus, is inadequate for the base formulation of an aqueous lubricant composition. In contrast thereto, by combining these three components of the general formulae I to III in accordance with the present invention, the thermal variation of the viscosity was almost completely excluded and, at the same time, superior storage stability was attained (see Sample Nos. 1 to 7). Moreover, the aqueous lubricant compositions according to the present invention did not exhibit lowering of viscosity due to shearing stress, in contrast to the case of conventional high molecular weight thickening agents (see, for example, Sample No. 18), so that they are very suitable as aqueous lubricants.

TABLE 1

| Sample No. | Composition Structure | | Wt. % | Cloud Pt. (°C.) | Kinematic Viscosity (cSt) 40° C. | 25° C. | 10° C. | Storage Stability | Shear Stability |
|---|---|---|---|---|---|---|---|---|---|
| 1* | $C_{18}H_{35}O(C_2H_4O)_9H$ | (I) | 2.0 | 85 | 30.7 | 26.2 | 24.8 | O | 1.01 |
|  | i-$C_{18}H_{37}O(C_3H_6O)_5(C_2H_4O)_{12}H$ | (I) | 1.0 |  |  |  |  |  |  |
|  | $HO(C_3H_6O)_{10}(C_2H_4O)_{45}(C_3H_6O)_{10}H$ | (II) | 1.0 |  |  |  |  |  |  |
|  | $C_{17}H_{33}CON(C_2H_4OH)_2$ | (IIIb) | 2.0 |  |  |  |  |  |  |
|  | Water |  | 94.0 |  |  |  |  |  |  |
| 2* | $C_9H_{19}\text{-}\bigcirc\text{-}O(C_2H_4O)_{18}H$ | (I) | 3.0 | over 90 | 35.9 | 40.1 | 48.8 | O | 0.99 |
|  | $HO(C_3H_6O)_{75}(C_2H_4O)_{80}(C_3H_6O)_{75}H$ | (II) | 3.0 |  |  |  |  |  |  |
|  | $C_{11}H_{23}CON\text{—}(C_2H_4O)_5H$ $\text{—}(C_2H_4O)_5H$ | (IIIa) | 4.0 |  |  |  |  |  |  |
|  | Water |  | 90.0 |  |  |  |  |  |  |
| 3* | $C_6H_{13}O(C_2H_4O)_2(C_3H_6O)H$ | (I) | 5.0 | over 90 | 89.8 | 81.2 | 71.9 | O | 0.98 |
|  | $CH_2O(C_2H_4O)_{200}(C_3H_6O)_{30}H$ $CHO(C_2H_4O)_{200}(C_3H_6O)_{30}H$ $CH_2O(C_2H_4O)_{200}(C_3H_6O)_{30}H$ | (II) | 20.0 |  |  |  |  |  |  |
|  | $C_{17}H_{33}CON\text{—}(C_2H_4O)_{17}H$ $\text{—}C_2H_5$ | (IIIa) | 5.0 |  |  |  |  |  |  |
|  | Water |  | 70.0 |  |  |  |  |  |  |
| 4* | $C_{12}H_{25}O(C_3H_6O)_{50}(C_2H_4O)_{50}(C_3H_6O)_{50}H$ | (I) | 2.0 | 86 | 41.9 | 48.5 | 38.6 | O | 1.00 |
|  | $HO(C_3H_6O)_{30}(C_2H_4O)_{100}(C_3H_6O)_{30}H$ | (II) | 4.0 |  |  |  |  |  |  |
|  | $C_{15}H_{31}CON(C_3H_6OH)_2$ | (IIIb) | 3.0 |  |  |  |  |  |  |
|  | Water |  | 91.0 |  |  |  |  |  |  |
| 5* | $C_{18}H_{35}O(C_2H_4O)_8H$ | (I) | 3.0 | 77 | 27.8 | 23.5 | 20.0 | O | 1.02 |
|  | i-$C_{20}H_{41}O(C_3H_6O)_{21}(C_2H_4O)_{40}(C_3H_6O)_{40}H$ | (I) | 1.0 |  |  |  |  |  |  |
|  | $HO(C_4H_8O)_2(C_2H_4O)_{10}(C_4H_8O)_2H$ | (II) | 1.0 |  |  |  |  |  |  |
|  | $C_{11}H_{23}CON\text{—}(C_2H_4O)_2C_3H_6OH$ $\text{—}(C_2H_4O)_2C_3H_6OH$ | (IIIa) | 1.0 |  |  |  |  |  |  |
|  | Water |  | 94.0 |  |  |  |  |  |  |
| 6* | $C_8H_{17}O(C_4H_8O)_{30}(C_2H_4O)_{50}H$ | (I) | 2.0 | 65 | 20.0 | 18.8 | 15.3 | O | 1.01 |
|  | $HO(C_3H_6O)_{20}[(C_3H_6O)_{10}(C_2H_4O)_{40}](C_3H_6O)_{20}H$ | (II) | 2.0 |  |  |  |  |  |  |
|  | $C_7H_{15}CON\text{—}C_2H_4OH$ $\text{—}C_8H_{17}$ | (IIIa) | 2.0 |  |  |  |  |  |  |
|  | Water |  | 94.0 |  |  |  |  |  |  |
| 7* | $C_{20}H_{41}O(C_3H_6O)_{20}(C_2H_4O)_{120}(C_3H_6O)_{40}H$ | (I) | 1.0 | 89 | 34.1 | 30.3 | 27.9 | O | 1.00 |
|  | $C[CH_2O(C_2H_4O)_{100}(C_3H_6O)_{50}H]_4$ | (II) | 2.0 |  |  |  |  |  |  |
|  | $C_{17}H_{33}CON(C_2H_4OH)_2$ | (IIIb) | 2.0 |  |  |  |  |  |  |
|  | $HO(C_2H_4O)_{250}(C_3H_6O)_{50}H$ | (IV) | 5.0 |  |  |  |  |  |  |
|  | Water |  | 90.0 |  |  |  |  |  |  |
| 8** | $C_{18}H_{35}O(C_2H_4O)_9H$ | (I) | 5.0 | 35 | (indeterminable) | 10.3 | 3.5 | O | 0.98 |
|  | Water |  | 95.0 |  |  |  |  |  |  |
| 9** | $HO(C_3H_6O)_{10}(C_2H_4O)_{45}(C_3H_6O)_{10}H$ | (II) | 5.0 | 57 | 1.21 | 1.09 | 0.99 | O | 0.98 |
|  | Water |  | 95.0 |  |  |  |  |  |  |
| 10** | $C_{17}H_{33}CON(C_2H_4OH)_2$ | (IIIb) | 5.0 | over 90 | 27.6 | 57.9 | 145.0 | X | 0.96 |
|  | Water |  | 95.0 |  |  |  |  |  |  |
| 11** | $C_{18}H_{35}O(C_2H_4O)_9H$ | (I) | 3.0 | 55 | 37.3 | 15.4 | 4.6 | O | 1.01 |
|  | i-$C_{18}H_{37}O(C_3H_6O)_5(C_2H_4O)_{12}H$ | (I) | 2.0 |  |  |  |  |  |  |
|  | Water |  | 95.0 |  |  |  |  |  |  |
| 12** | $C_{12}H_{25}O(C_3H_6O)_2(C_2H_4O)_9(C_3H_6O)_2H$ | (I) | 3.0 | over 90 | 4.7 | 8.3 | 17.8 | O | 0.99 |
|  | $HO(C_4H_8O)_2(C_2H_4O)_{46}(C_4H_8O)_2H$ |  | 5.0 |  |  |  |  |  |  |
| — | $C_{11}H_{23}CON\text{—}(C_2H_4O)_5H$ $\text{—}(C_2H_4O)_5H$ | (IIIa) | 2.0 |  |  |  |  |  |  |
|  | Water |  | 90.0 |  |  |  |  |  |  |
| 13** | $C_4H_9O(C_2H_4O)_5H$ |  | 2.0 | over 90 | 3.5 | 7.8 | 13.1 | O | 1.01 |
|  | $HO(C_3H_6O)_{10}(C_2H_4O)_{45}(C_3H_6O)_{10}H$ | (II) | 3.0 |  |  |  |  |  |  |

TABLE 1-continued

| Sample No. | Composition Structure | | Wt. % | Cloud Pt. (°C.) | Kinematic Viscosity (cSt) 40° C. | 25° C. | 10° C. | Storage Stability | Shear Stability |
|---|---|---|---|---|---|---|---|---|---|
| | $C_{11}H_{23}CON\!\!<\!\!\genfrac{}{}{0pt}{}{(C_2H_4O)_5H}{(C_2H_4O)_5H}$ | (IIIa) | 2.0 | | | | | | |
| 14** | Water | | 93.0 | | (No homogeneous solution was formed) | | | | |
| | $C_{18}H_{35}O(C_2H_4O)_9H$ | (I) | 2.0 | | | | | | |
| | $HO(C_3H_6O)_{50}(C_2H_4O)_{30}(C_3H_6O)_{50}H$ | | 3.0 | | | | | | |
| | $C_{11}H_{23}CON\!\!<\!\!\genfrac{}{}{0pt}{}{(C_2H_4O)_2H}{(C_2H_4O)_2H}$ | (IIIa) | 2.0 | | | | | | |
| 15** | Water | | 93.0 | over 90 | 1.6 | 3.9 | 7.3 | O | 1.03 |
| | $C_{18}H_{35}O(C_3H_6O)_{30}(C_2H_4O)_{200}H$ | | 2.0 | | | | | | |
| | $HO(C_3H_6O)_2(C_2H_4O)_4(C_3H_6O)_2H$ | | 2.0 | | | | | | |
| | $C_{11}H_{23}CON\!\!<\!\!\genfrac{}{}{0pt}{}{(C_2H_4O)_2H}{(C_2H_4O)_2H}$ | (IIIa) | 2.0 | | | | | | |
| 16** | Water | | 94.0 | | (No homogeneous solution was formed) | | | | |
| | $C_{18}H_{35}O(C_3H_6O)_{10}(C_2H_4O)_5(C_3H_6O)_{10}H$ | | 3.0 | | | | | | |
| | $HO(C_3H_6O)_{10}(C_2H_4O)_{45}(C_3H_6O)_{10}H$ | (II) | 3.0 | | | | | | |
| | $C_{11}H_{23}CON\!\!<\!\!\genfrac{}{}{0pt}{}{(C_2H_4O)_{25}H}{(C_2H_4O)_{25}H}$ | | 4.0 | | | | | | |
| 17** | Water | | 90.0 | over 90 | 2.5 | 6.1 | 10.3 | O | 1.00 |
| | $C_{12}H_{25}O(C_2H_4O)_6H$ | (I) | 1.0 | | | | | | |
| | $HO(C_3H_6O)_{10}(C_2H_4O)_{45}(C_3H_6O)_{10}H$ | (II) | 3.0 | | | | | | |
| | $C_5H_{11}CON\!\!<\!\!\genfrac{}{}{0pt}{}{(C_2H_4O)_2H}{(C_2H_4O)_2H}$ | | 1.0 | | | | | | |
| | Water | | 95.0 | | | | | | |
| 18** | Polyethylene oxide having average mol. weight of $2.5 \times 10^5$ | | 5.0 | over 90 | 9.7 | 56.1 | 212 | O | 0.63 |
| | Water | | 95.0 | | | | | | |
| 19** | $HO(C_2H_4O)_{250}(C_3H_6O)_{50}H$ | | 5.0 | over 90 | 1.68 | 3.5 | 5.7 | O | 1.00 |
| | Water | | 95.0 | | | | | | |

*Formulation according to the present invention
**Comparison formulation

EXAMPLE 2

Water base hydraulic fluids were prepared by dissolving in each 100 parts by weight of the Samples No. 1, 4, 10 and 18 of Example 1 the following additive mixture:

Additive Mixture

Oleic acid: 1.0 part by weight
Potassium hydroxide: 0.2 part by weight
Morpholine: 0.2 part by weight
Benzotriazole: 0.1 part by weight
Antifoaming agent (KM-84 of Shinetsu Chem. Ind. Co.): 0.01 part by weight Using these water base hydraulic fluids, pumping tests were carried out under the condition:

Hydraulic pump: V-104C vane pump of Sperry Vickers Co.
Fluid volume: 80 l
Discharge pressure: 70 Kg/cm²
Pump revolution rate: 1,200 r.p.m.
Test duration: 100 hr.
Fluid temperature: 50° C.

The results of the Tests are summarized in Table 2. In Table 2, the viscosity ratio is defined by the equation Viscosity Ratio = $\nu_2'/\nu_1'$ wherein $\nu_1'$ and $\nu_2'$ denote the kinematic viscosities of the fluid before and after the test respectively.

As is clear from Table 2, the aqueous lubricant composition according to the present invention is excellent in that the rate of wear of the pump is low with complete exclusion of occurrence of sludge and that the kinematic viscosity as well as the viscosity ratio will scarcely vary during operation, so that they are very suitable for water base hydraulic fluid.

TABLE 2

| Sample No. | Wear of Pump (mg) at Cam Ring | Vane | Total | Occurrence of Sludge | Kinematic Viscosity (40° C., cSt) before Test | after Test | Viscosity Ratio (40° C.) |
|---|---|---|---|---|---|---|---|
| 1* | 354 | 105 | 459 | none | 31.3 | 31.3 | 1.00 |
| 4* | 240 | 91 | 331 | none | 42.9 | 42.6 | 0.99 |
| 10** | 850 | 138 | 988 | some | 27.8 | 25.4 | 0.91 |
| 18** | 756 | 140 | 896 | some | 10.1 | 6.3 | 0.62 |

*According to the present invention
**Comparison formulation

We claim:

1. An aqueous lubricant composition consisting essentially of (A) from 0.1 to 30 wt.% of a compound of the formula:

$$R^1Y[(C_pH_{2p}O)_a(C_2H_4O)_b(C_qH_{2q}O)_cH]_m \quad (I)$$

wherein $R^1$ is a hydrocarbon group having 5 to 26 carbon atoms, Y is an oxygen atom or a nitrogen atom, p and q are each 3 or 4, $a \geq 0$, $b \geq 2$ and $c \geq 0$, with the provisos that the sum of $a+b+c$ is in the range of 2 to 200 and the ratio $(a+c)/b$ is in the range of 0 to 7/3, m is 1 when Y is an oxygen atom and m is 2 when Y is a nitrogen atom, each of the groups $-(C_pH_{2p}O)_a-$, $-C_2H_4O)_b-$ and $-(C_qH_{2q}O)_c-$ being present as block segments;

(B) from 0.1 to 30 wt.% of a compound of the formula:

$$R^2[Y[\{(C_2H_4O)_d(C_pH_{2p}O)_e\}(C_qH_{2q}O)_fH]_m]_n \quad (II)$$

wherein $R_2$ is a residue of a polyhydric alcohol, a polyhydric phenol, or a polyamine each having 2 to 26 carbon atoms, Y, p and q and m have the same meanings as defined above, $d>0$, $e \geq 0$ and $f>0$, n is an integer of from 2 to 8, with the provisos that the sum of $d+e+f$ is in the range of 10 to 3,000, the ratio $e/d$ is in the range of 0 to 1, the ratio $f/(d+e)$ is in the range of 1/9 to 0.8, the segment $\{(C_2H_4O)_d(C_pH_{2p}O)_e\}$ in said formula (II) represents a chain formed by random addition when e is greater than 0, the segment $[\{(C_2H_4O)_d(C_pH_{2p}O)_e\}(C_qH_{2q}O)_fH]$ is in the form of addition blocks in the sequence given in said formula (II) and the content of $C_{3-4}$oxyalkylene blocks is not higher than 49.6% by weight;

(C) 0.1 to 20 wt.% of a compound of the formula:

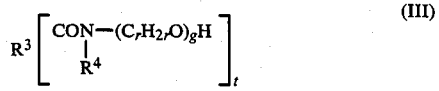

$$(III)$$

wherein $R^3$ is a hydrocarbon group obtained when a mono- or polycarboxylic acid having 8 to 54 carbon atoms is reacted with an alkanolamine or an alkylalkanolamine to form the formula III compound, $R^4$ is a hydrogen atom, a hydrocarbon group having 1 to 26 carbon atoms, or a group of the formula $-(C_sH_{2s}O)h_H$, t is an integer of from 1 to 5, r and s are each 2 or 3, and g and h are each a number in the range of 1 to 20; and (D) 20 to 99.7 wt.% of water.

2. A composition according to claim 1, wherein said composition contains 0.1 to 25 wt.% of (A), 0.1 to 25 wt.% of (B), and 20 to 99.6 wt.% of (D), and said composition further contains (E) 0.1 to 10 wt.% of a water-soluble polyalkylene glycol having a number-average molecular weight of from 500 to 100,000.

3. A composition according to claim 1, wherein said composition contains 80 to 99 wt.% of water (D).

4. A composition according to claim 2, wherein said composition contains 80 to 99 wt.% of water (D).

5. A composition according to claim 1, wherein $R^1$ is a residue of a compound selected from the group consisting of pentanol, hexanol, heptanol, octanol, nonanol, decanol, undecanol, dodecanol, tridecanol, tetradecanol, pentadecanol, hexadecanol, heptadecanol, octadecanol, nonadecanol, cyclopentanol, cyclohexanol, benzyl alcohol, cinnamyl alcohol, oleyl alcohol, octyl phenol, nonyl phenol, decylamine, dodecylamine, tridecylamine, tetradecylamine, pentadecylamine, hexadecylamine, heptadecylamine, octadecylamine, and oleylamine.

6. A composition according to claim 1, wherein $R^2$ is a residue of a compound selected from the group consisting of ethylene, glycol, propylene glycol, butanediol, hexylene glycol, octylene glycol, glycerin, trimethylolpropane, pentaerythritol, sorbitol, glucose, sucrose, ethyl diethanolamine, butyl diethanolamine, triethanolamine, tripropanolamine, N,N'-dinaphthyl-p-phenylenediamine, 4,4'-diaminodiphenylmethane, 4,4'-diaminodicyclohexylmethane, ethylenediamine, diethylenetriamine, triethylenetetramine, tetraethylenepentamine, pentaethylenehexamine, bisphenol A, hydrogenated bisphenol A, 4,4'-butylidene-bis(6-tert.-butyl-3-methylphenol), 4,4'-thiobis(6-tert.-butyl-3-methylphenol), catechol, and resorcinol.

7. A composition according to claim 1, wherein said compound of formula (III) is formed by reacting a mono- or polycarboxylic acid selected from the group consisting of caprylic acid, pelargonic acid, capric acid, undecanoic acid, lauric acid, tridecanoic acid, myristic acid, pentadecanoic acid, palmitic acid, heptadecanoic acid, stearic acid, nonadecanoic acid, arachic acid, behenic acid, cerotic acid, undecylenic acid, oleic acid, elaidic acid, linolic acid, linoleic acid, dimerized or trimerized acids obtained by oligomerization of unsaturated fatty acids, azelaic acid, undecanedioic acid, dodecanedioic acid, tridecanedioic acid, pentadecanedioic acid, hexadecanedioic acid, octadecanedioic acid, and eicosanedioic acid, or ester thereof, with an alkanolamine or alkylalkanolamine selected from the group consisting of monoethanolamine, diethanolamine, monopropanolamine, dipropanolamine, ethylmonoethanolamine, butylmonoethanolamine, and addition products thereof obtained by adding thereto ethylene oxide units, propylene oxide units or both ethylene oxide units and propylene oxide units.

8. A composition according to claim 1, wherein said compound of the formula (I) is selected from the group consisting of:

$$C_8H_{17}O(C_4H_8O)_{30}(C_2H_4O)_{50}H,$$

$$C_{20}H_{41}O(C_3H_6O)_{20}(C_2H_4O)_{120}(C_3H_6O)_{40}H,$$

$$C_{18}H_{35}O(C_2H_4O)_9H,$$

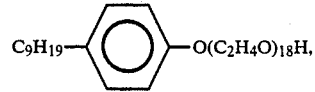

$$C_6H_{13}O(C_2H_4O)_2(C_3H_6O)H,$$

$$C_{12}H_{25}O(C_3H_6O)_{50}(C_2H_4O)_{50}(C_3H_6O)_{50}H,$$

$$\text{i-}C_{18}H_{37}O(C_3H_6O)_5(C_2H_4O)_{12}H, \text{ and}$$

$$\text{i-}C_{20}H_{41}O(C_3H_6O)_{21}(C_2H_4O)_{40}(C_3H_6O)_{40}H;$$

said compound of the formula (II) is selected from the group consisting of:

$$HO(C_3H_6O)_{10}(C_2H_4O)_{45}(C_3H_6O)_{10}H,$$

$$HO(C_3H_6O)_{75}(C_2H_4O)_{80}(C_3H_6O)_{75}H,$$

-continued $$\begin{array}{l}CH_2O(C_2H_4O)_{200}(C_3H_6O)_{30}H\\|\\CHO(C_2H_4O)_{200}(C_3H_6O)_{30}H\;,\\|\\CH_2O(C_2H_4O)_{200}(C_3H_6O)_{30}H\end{array}$$

$HO(C_3H_6O)_{30}(C_2H_4O)_{100}(C_3H_6O)_{30}H,$ $HO(C_4H_8O)_2(C_2H_4O)_{10}(C_4H_8O)_2H,$ $HO(C_3H_6O)_{20}\{(C_3H_6O)_{10}(C_2H_4O)_{40}\}(C_3H_6O)_{20}H,$ and $C[CH_2O(C_2H_4O)_{100}(C_3H_6O)_{50}H]_4;$ and said compound of the formula (III) is selected from the group consisting of:

$C_{17}H_{33}CON(C_2H_4OH)_2$ $$C_{11}H_{23}CON\!\!\begin{array}{l}-(C_2H_4O)_5H\\ \diagdown\\(C_2H_4O)_5H\end{array}$$

$$C_{17}H_{33}CON\!\!\begin{array}{l}-(C_2H_4O)_{17}H,\\ \diagdown\\ C_2H_5\end{array}$$

$C_{15}H_{31}CON(C_3H_6OH)_2,$ $$C_{11}H_{23}CON\!\!\begin{array}{l}-(C_2H_4O)_2C_3H_6OH\\ \diagdown\\(C_2H_4O)_2C_3H_6OH\end{array},\;\text{and}\;\;C_7H_{15}CON\!\!\begin{array}{l}-C_2H_4OH.\\ \diagdown\\ C_8H_{17}\end{array}$$

9. A composition according to claim 2, wherein said polyalkylene glycol has the formula:

$HO(C_2H_4O)_{250}(C_3H_6O)_{50}H.$

10. A composition according to claim 1, wherein said composition further contains (F) 0.1 to 10 wt.% of a water-soluble compound selected from the group consisting of polyacrylic acid salts, maleic acid copolymer salts, polyacrylamide, polyethyleneamine, urea resins, polyvinyl alcohol, polyethers, polyacrylic acids, and polymethacrylic acids, said water-soluble compound having a number-average molecular weight in the range of from 500 to 100,000.

11. A composition according to claim 1, wherein Y represents an oxygen atom in said formulas I and II.

12. A composition according to claim 1, wherein t equals 1.

* * * * *

UNITED STATES PATENT AND TRADEMARK OFFICE
CERTIFICATE OF CORRECTION

PATENT NO. : 4 828 735
DATED : May 9, 1989
INVENTOR(S) : Kenichiro MINAGAWA et al It is certified that error appears in the above-identified patent and that said Letters Patent is hereby corrected as shown below:

Column 13, line 47; change the formula to read as follows:

$$\text{---} -(C_sH_{2s}O)_hH \text{---}.$$

Signed and Sealed this

Twentieth Day of February, 1990

*Attest:*

JEFFREY M. SAMUELS

*Attesting Officer*    *Acting Commissioner of Patents and Trademarks*